US011879292B2

(12) United States Patent
Janick et al.

(10) Patent No.: US 11,879,292 B2
(45) Date of Patent: Jan. 23, 2024

(54) SEALS FOR VERTICALLY STACKING PANEL DOOR

(71) Applicant: CornellCookson, LLC, Mountain Top, PA (US)

(72) Inventors: James Janick, Shavertown, PA (US); Joseph A. Garrah, Nanticoke, PA (US); Brandon Carl Smith, Wapwallopen, PA (US)

(73) Assignee: CORNELLCOOKSON, LLC, Mountain Top, PA (US)

( * ) Notice: Subject to any disclaimer, the term of this patent is extended or adjusted under 35 U.S.C. 154(b) by 0 days.

(21) Appl. No.: 17/751,564

(22) Filed: May 23, 2022

(65) Prior Publication Data

US 2023/0374850 A1 Nov. 23, 2023

(51) Int. Cl.
*E06B 3/92* (2006.01)
*E06B 7/23* (2006.01)

(52) U.S. Cl.
CPC .............. *E06B 7/231* (2013.01); *E06B 3/927* (2013.01)

(58) Field of Classification Search
CPC ........ E06B 7/231; E06B 3/927; E06B 7/2307; E06B 7/2305; E06B 3/925; E06B 3/92
See application file for complete search history.

(56) References Cited

U.S. PATENT DOCUMENTS

| | | | | |
|---|---|---|---|---|
| 2,042,175 | A | 5/1936 | Gill et al. | |
| 4,460,030 | A * | 7/1984 | Tsunemura | E06B 9/0638 160/35 |
| 5,784,834 | A * | 7/1998 | Stutzman | E06B 7/2307 49/197 |
| 6,374,567 | B1 * | 4/2002 | Mullet | E06B 9/582 52/717.03 |
| 7,469,737 | B2 * | 12/2008 | Mullet | E05F 15/686 292/28 |
| 8,910,421 | B2 * | 12/2014 | Potter | E06B 7/24 49/495.1 |
| 9,279,287 | B2 | 3/2016 | Balay et al. | |
| 2008/0230188 | A1 * | 9/2008 | Albert | E06B 3/927 160/113 |
| 2014/0373457 | A1 * | 12/2014 | Eungard | E05D 15/24 49/490.1 |
| 2017/0152705 | A1 * | 6/2017 | Frede | E06B 9/17076 |

FOREIGN PATENT DOCUMENTS

DE 202020106414 U1 11/2020

OTHER PUBLICATIONS

International Search Report and Written Opinion mailed in corresponding PCT Patent Application No. PCT/US2022/030592 dated Sep. 1, 2022, 10 pages.

* cited by examiner

*Primary Examiner* — Janet M Wilkens
*Assistant Examiner* — Susan M. Heschel

(57) ABSTRACT

In example implementations, a header seal for a vertical stacking panel door is provided. The header seal includes a header channel and a seal plate. The header channel includes a body portion comprising a plurality of openings to receive a mechanical fastener and a lip portion coupled to the body portion. The seal plate includes a bracket comprising a plurality of openings to receive a mechanical fastener to connect the bracket to the top most vertical panel and a flexible member to contact the lip portion to form a seal against the lip of the header channel when the vertically stacking panel door is in a closed position.

15 Claims, 6 Drawing Sheets

SEALS FOR VERTICALLY STACKING PANEL DOOR

BACKGROUND

Overhead doors can be used for a variety of applications. For example, overhead doors can be used as garage doors in residential locations or doors for bays and entrances to warehouses in commercial locations.

Some overhead doors can be pulled open through a counterbalance system that includes a motor, a torsion spring, a rotating shaft connected to the motor and torsion spring, and a cable/strap system that connects the bottom section of the door to the rotating shaft. Through the movement of the counterbalance system, the door moves along a track. Typically, the moving door can be moved along the track, as the sections of the door are connected by hinges to lie horizontally with the floor along the track. If the door has door sections that are connected by hinges to assist in moving the sections along the track, then the design of the counterbalance system and the track alone provide the mechanism to open and close the door section.

DETAILED DESCRIPTION

Examples described herein provide examples of edge seals for a vertically stacking panel door that is without hinged connections between each panel. As discussed above, currently available overhead doors are moved along a track by a counterbalance system. The door lies horizontally or parallel with the floor in a single piece.

However, since the vertically stacking panel door is formed by individual panels, there may be potential for the formation of gaps or openings at the edges of the door sections that can cause air to pass through. There may be certain air infiltration requirements for doors in certain buildings and locations, as these components make up the envelope of a building structure. For example, a door may be desired to minimize air infiltration or air leakage for the entire door assembly.

The present disclosure provides seals for a vertically stacking panel door. The seals may eliminate gaps when the vertically stacking panel door is closed to reduce or minimize air infiltration. In one embodiment, the vertically stacking panel door may include a header seal. The header seal may include a header channel that is adjustable, such that header channel and a seal plate can form a proper seal when the vertically stacking panel door is closed.

In one embodiment, the seal may also include a vertical seal along the outer edges of the vertical stacking panel door. The vertical seal may also prevent air infiltration between the vertically stacking panel door and the door jamb or track system. Thus, the seals of the present disclosure for the vertically stacking panel door may reduce or minimize overall air infiltration when the vertically stacking panel door is closed.

Figure 1:
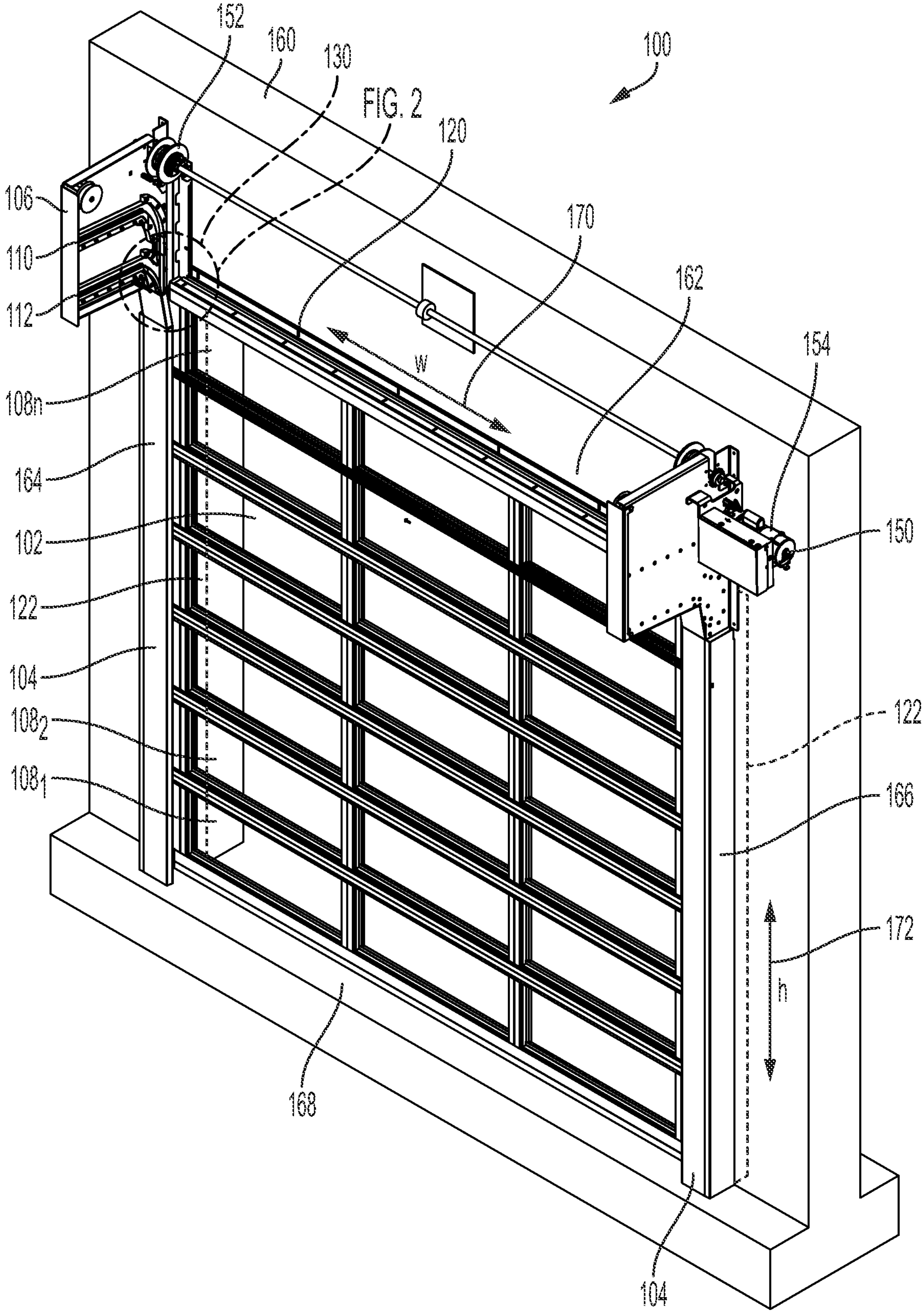
FIG. 1 illustrates an isometric view of an example of the vertically stacking panel door of the present disclosure.

FIG. 1 illustrates an isometric view of an example vertically stacking panel door system 100 of the present disclosure. The vertically stacking panel door system 100 may include a door 102 that is comprised of a plurality of disconnected panels $\mathbf{108}_1$ to 108*n* (hereinafter also referred to individually as a panel 108 or collectively as panels 108). The door 102 may be opened by moving the panels 108 vertically along a track or track system. The track system may include different track portions that define a path along which the panels 108 may move to open and close the door 102.

In one embodiment, the track may include opposing vertical track portions 104 and a horizontal track portion 106 that includes a first horizontal track portion 110 (also referred to herein as a first track 110) and a second horizontal track portion 112 (also referred to herein as a second track 112). The opposing vertical track portions 104 may include a first vertical track 104 on a first side of a door jamb 164 and a second vertical track 104 on a second side of a door jamb 166.

A panel interface zone may also be included between the opposing vertical track portions 104 and the horizontal track portion 106. The panel interface zone defines a transitional area between the vertical door track 104 and a horizontal track portion 106. The panel interface zone proves the means for lifting and separating the plurality of panels 108 when the door 102 is opening and to align and place the plurality of panels 108 in tangential connection when the door 102 is closing. As the panels 108 are separated, the panels 108 can be stacked along the horizontal track portion 106. As the panels 108 are aligned and tangentially connected, the panels 108 can be stacked in a vertical orientation along the opposing vertical track portions 104.

In one embodiment, the door 102 may be closed by moving the panels 108 towards the vertical track 104 one-by-one. The panels 108 may be stacked on top of one another as the door 102 is closed.

In one embodiment, the vertically stacking panel door system 100 may include a counterbalance system 150. The counterbalance system 150 may include a drum 152 which may be connected to a strap (not shown) that is coupled to the bottom most panel 108 (e.g., panel $\mathbf{108}_1$ in FIG. 1). The drum 152 may be coupled to a motor 154 and powered by the motor 154 or may be manually operated to rotate. The counterbalance system 150 may further be connected to a torsion spring (not shown). When the drum 152 is operated to open the door 102, the drum 152 may pull the bottom most panel 108 up, with the torsion spring providing forces to assist in the pull. When the drum 152 is operated to close the door 102, the drum 152 may rotate in an opposite direction to apply tension to the torsion spring and to allow the bottom most panel 108 to descend through the panel interface zone and down the opposing vertical track portions 104 into a closed position.

As discussed above, the door 102 may be comprised of disconnected panels 108. Thus, there may be gaps that are present or can form along the edge of the door 102 near the door jambs 164 and 166, especially when the sections are subjected to forces such as wind or seismic activity, causing the panels to flex. In addition, small gaps may be formed along a topside 162 of a wall 160 where the vertically stacking panel door system 100 is installed.

The gaps may allow air to leak in and out of the building. This may cause thermal issues (e.g., allowing cool air to escape during warm weather or allowing hot air to escape during cold weather). The thermal performance may be measured by ASTM method E283-04 (2012), Standard Test Method for Determining Rate of Air Leakage Through Exterior Windows, Curtain Walls, and Doors Under Specified Pressure Differences Across the Specimen at 75 Pa (1.57 psf). To improve the thermal performance of the vertically stacking panel door system 100 and to minimize air infiltration, the present disclosure provides a header seal 120 and/or vertical seals 122 (shown in phantom on the interior side of the wall 160). The header seal 120, the vertical seals 122, and the bottom most panel $\mathbf{108}_1$ against a floor 168 may form a relatively good seal to reduce air infiltration performance.

A door according to the present disclosure having aluminum frames with glazing, steel guides, and 1/"8 plexiglass glazing is secured to spruce-pine fir wood bucks and secured with ⅝"×1⅝" lag hex washer head screws located 22" on center with two bolts per location. Seals are located as describe herein at the perimeter of the door. Bulb seals are located at the top of each section. The overall area of the door is 9.3 $m^2$ (100.0 $ft^2$).

It is desired to have less than 0.30 cfm/$ft^2$ while testing at 75 Pa at 28° C. (83° F.). For example, the vertically stacking panel door system 100 with the header seal 120 and the vertical seals 122 was tested for air infiltration. The vertically stacking panel door system 100 with the header seal 120 and the vertical seals 122 was found to have air infiltration of 0.2 cubic feet per minute per square foot (cfm/$ft^2$), where the maximum allowable amount was 0.30 cfm/$ft^2$.

Figure 2:
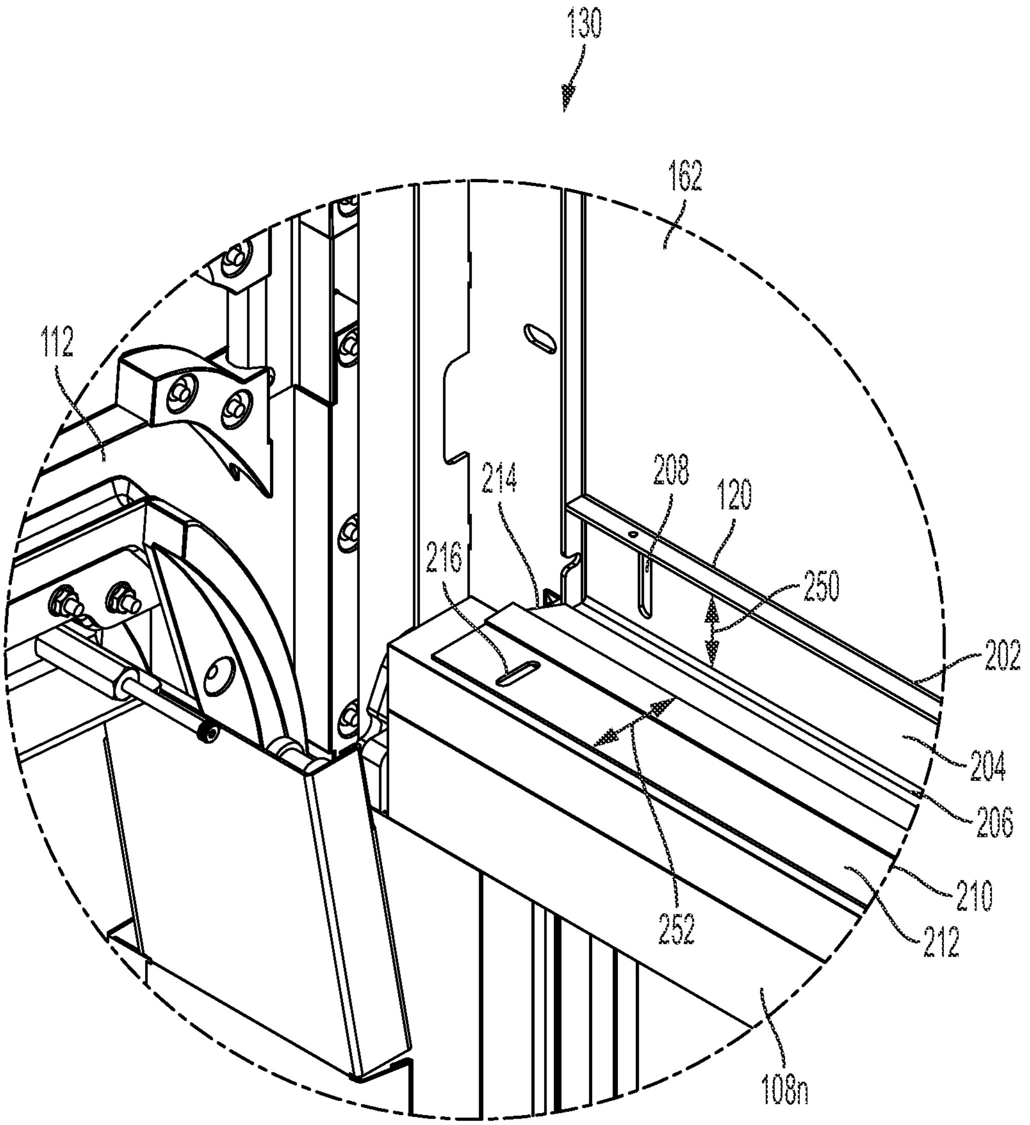
FIG. 2 is a zoomed in view of an example seal plate and header channel of the vertically stacking panel door of the present disclosure.

A close up view of an area 130 of the header seal 120 is shown in FIG. 2. FIG. 2 illustrates a more detailed view of the area 130 outlined in FIG. 1. In one embodiment, the header seal 120 may include a header channel 202 and a seal plate 210. The header seal 120 and the seal plate 210 may be arranged and aligned to form a seal along a top side of the door 102.

The header channel 202 may include a body portion 204 and a lip portion 206. The lip portion 206 may be coupled to the body portion 204 along an edge at 90 degrees (e.g., to form an "L" shape). In one embodiment, the body portion 204 and the lip portion 206 may be coupled together as separate parts or may be formed from a single metal or steel piece.

The body portion 204 and the lip portion 206 may both be planar or flat. In other words, the body portion 204 and the lip portion 206 may have a smooth level surface to allow a good seal to be formed between the lip portion 206 and a flexible member 214 of a seal bracket 210.

In one embodiment, the body portion 204 may include a plurality of openings 208 to receive a fastener. The plurality of openings 208 may be spaced apart across the body portion 204. The plurality of openings 208 may comprise slot shaped openings. The slot shaped openings 208 may be arranged vertically to provide a vertical adjustment tolerance when the header channel 202 is installed onto the top portion 162 of the wall 160 where the vertically stacking panel door system 100 is installed.

The header channel 202 may have a width as measured along a dimension shown by a line 170 in FIG. 1 that is approximately equal to the width of the door 102 or the width of each panel 108. The header channel 202 may also be used as an installation tool. For example, since the header channel 202 has a width that is approximately equal to the width of the door 102, the header channel 202 can be installed first to set the distance between the opposing vertical track portions 104 and the vertical seals 122. Thus, installing the header channel 202 first may allow the opposing vertical track portions 104 and the vertical seals 122 to be installed properly.

As noted above, the header seal 120 may also include the seal plate 210. The seal plate 210 may be coupled to a top most panel 108 (e.g., the panel **108*n*) of the door 102. The seal plate 210 may include a bracket 212 and the flexible member 214. The bracket 212 may be a flat metal bracket with a plurality of openings 216. The bracket 212 may be coupled to a top surface of the top most panel 108 via fasteners inserted through the plurality of openings 216**.

In one embodiment, the plurality of openings 216 may comprise slot shaped openings. The slot shaped openings 216 may be arranged horizontally to provide a horizontal adjustment tolerance when the seal plate 210 is installed on the top side of the top most panel 108.

For example, the seal plate 210 may be moved horizontally (e.g., towards the header channel 202 or away from the header channel 202 as shown by arrow 250) and the header channel 202 may be moved vertically (e.g., towards the seal plate 210 or away from the seal plate 210 as shown by arrow 252). Thus, the seal plate 210 and the header channel 202 may be installed such that the flexible member 214 comes to rest on top of the lip portion 206 when the door 102 is in the closed position.

In one embodiment, the flexible member 214 may be fabricated from rubber. In one embodiment, the flexible member 214 may be fabricated from any type of plastic or polymer. The flexible member 214 may extend away from the bracket 216 such that the flexible member 214 falls downwards against the lip portion 206 via gravity. This may allow a seal to be formed along to top portion of the door 102.

Figure 3:
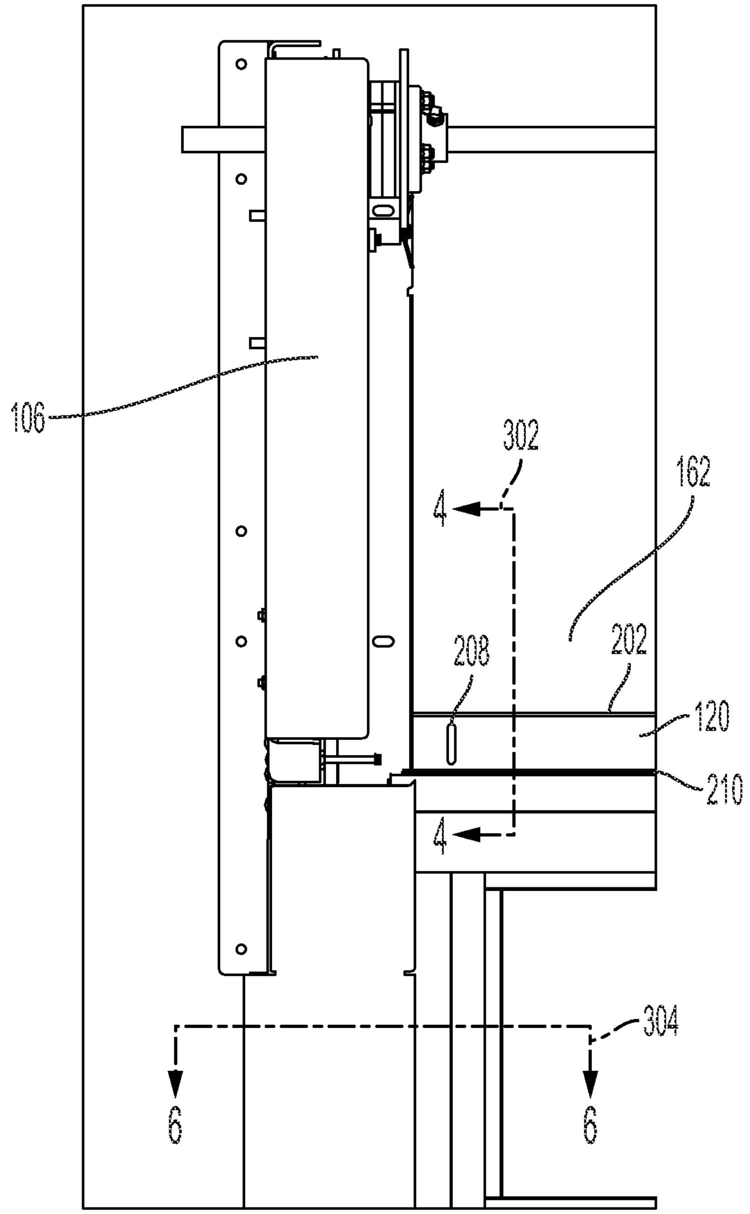
FIG. 3 is a front view of a section of the vertically stacking panel door that shows the seal plate and the header channel of the present disclosure.

FIG. 3 illustrates a front view of a section of the vertically stacking panel door system 100 that shows the header seal 120. FIG. 3 illustrates a front view of the header channel 202 and the seal plate 210. The slot shape of the openings 208 is also shown face-on in FIG. 3.

Figure 4:
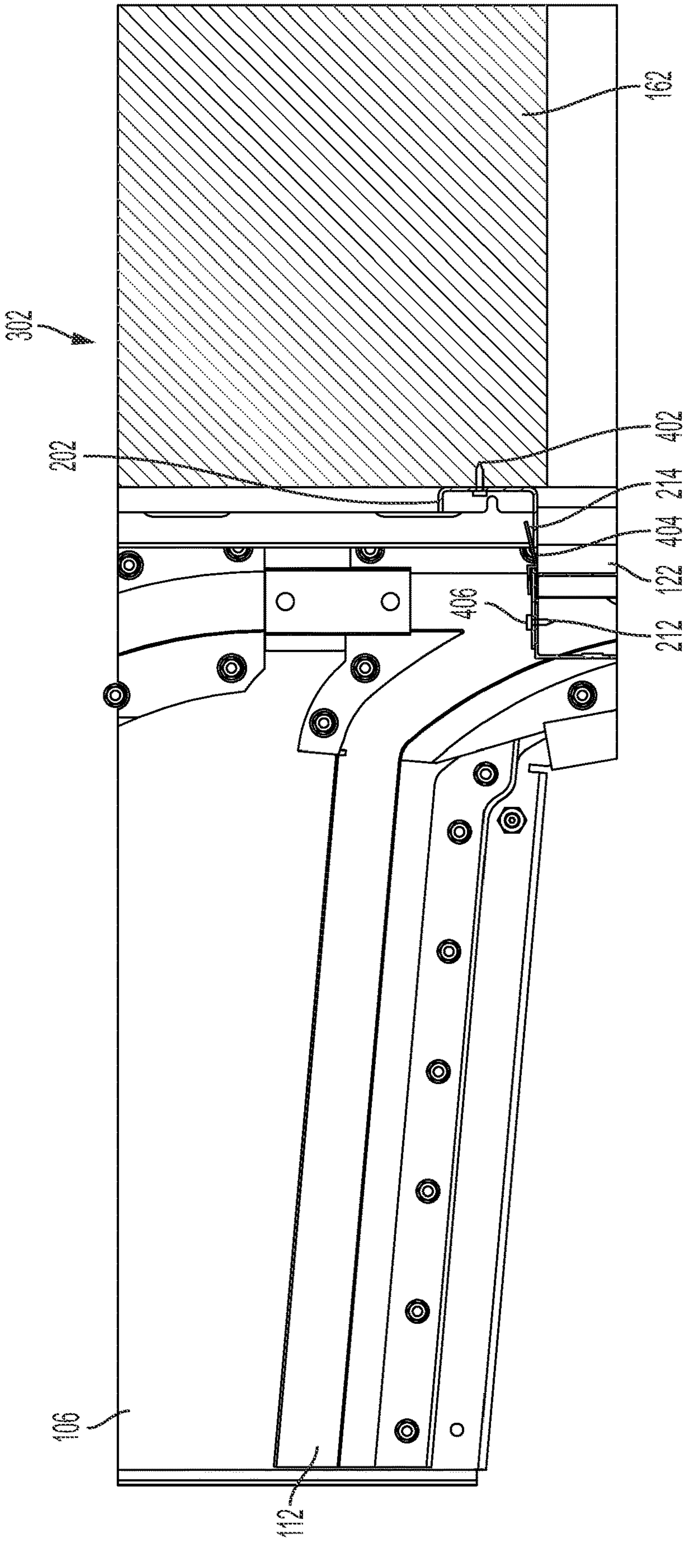
FIG. 4 is a cross-sectional side view of the seal plate and the header channel of the vertically stacking panel door looking at the horizontal track portion of the present disclosure.
Figure 5:
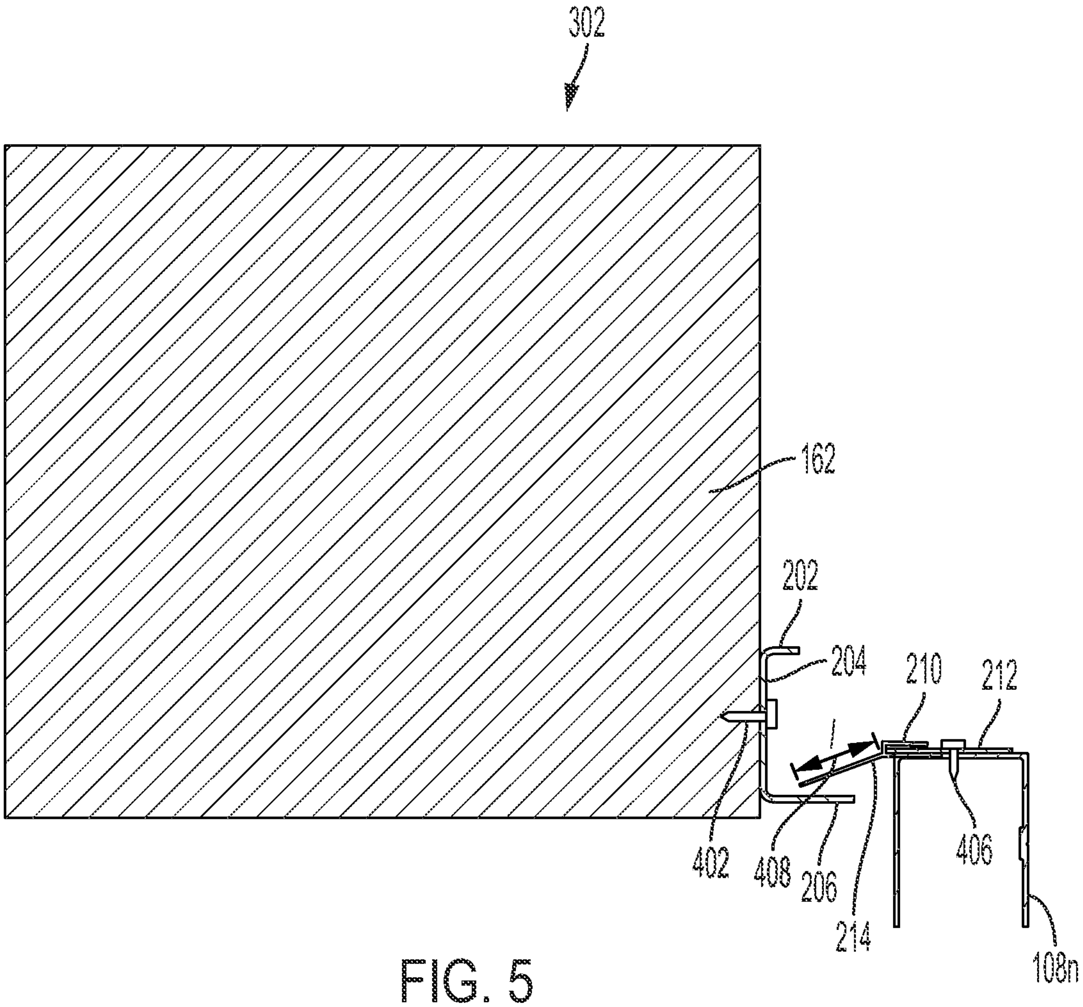
FIG. 5 is a cross-sectional side view of the seal plate and the header channel of the vertically stacking panel door looking away from the horizontal track portion of the present disclosure.

Detailed views of the header seal 120 are shown along a cross-section 302 in FIGS. 4 and 5. Detailed views of the vertical seals 122 are illustrated along a cross-section 304 illustrated in FIG. 6

FIG. 4 illustrates the cross-section view 302 when looking at the horizontal track portion 106. FIG. 4 illustrates a view when the door 102 is closed and the flexible member 214 rests against the lip portion 206 of the header channel 202 to form a seal.

FIG. 4 illustrates a fastener 402 that couples the header channel 202 against the top portion 162 of the wall 160. The fastener 402 may be inserted through one of the openings 208. The header channel 202 may be adjusted vertically to a desired position, and the fastener 402 may be tightened to hold the header channel 202 in the desired position against the top portion 162 of the wall 160.

FIG. 4 also illustrates a fastener 404 that is inserted through an opening 216 to couple the bracket 212 of the seal plate 210 against the top side of the top most panel 108. The bracket 212 may be adjusted horizontally to a desired position, and then the fastener 404 may be tightened to hold the seal plate 210 in the desired position against the top most panel 108.

The fasteners 402 and 404 may be any type of mechanical fasteners. For example, either or both of the fasteners 402 and 404 may be a wood screw, an anchor, a nut and bolt, a nail, and the like.

FIG. 4 also illustrates a view of how the vertical seal 122 may be installed such that a top 404 of the vertical seal 122 contacts the lip portion 206 of the header channel 202 and/or the flexible member 214 of the seal plate 210. As a result, when the door 102 is in the closed position, contact between the top 404 of the vertical seal 122 and the header channel 202 and/or the seal plate 210 may further reduce the air infiltration and improve the seal.

FIG. 5 illustrates the cross-section view 302 when looking away from the horizontal track portion 106. FIG. 5 illustrates a view when the door 102 is opening (e.g., the door 102 moves vertically upwards, and the panels 108 are collected in the horizontal track portion 106) and the flexible member 214 moves away from the lip portion 206 of the header channel 202. As noted above, the flexible member 214 may have a length 408 that is long enough for the weight of the flexible member 214 to fall down towards the lip 206. Thus, the force of gravity may help to press the flexible member 214 down against the lip 206 to form the seal illustrated in FIG. 4, and described above.

Figure 6:
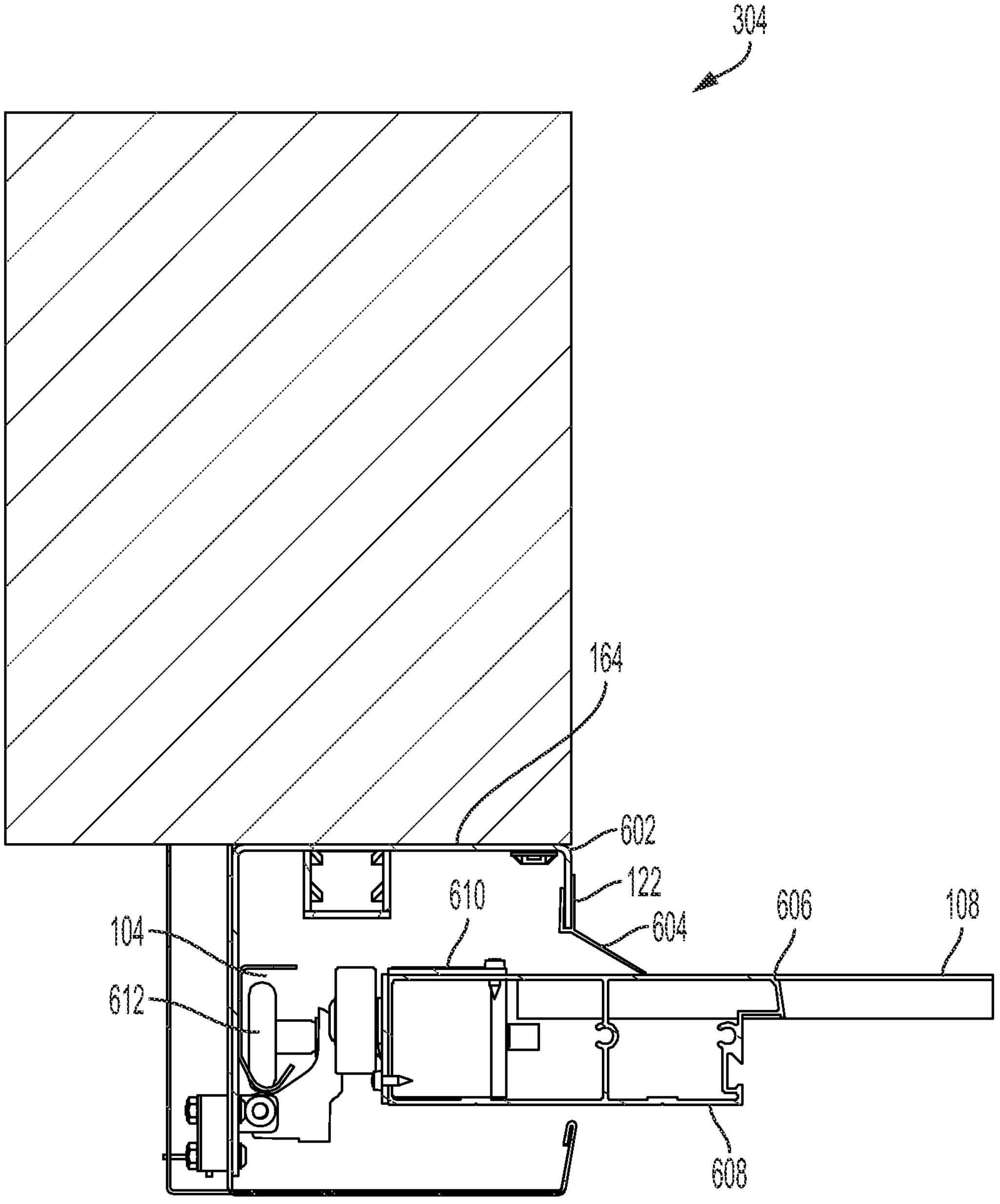
FIG. 6 is a top down view that illustrates a vertical seal of the vertically stacking panel door of the present disclosure.

FIG. 6 illustrates the cross-section view 304 looking down the door jamb 164. The cross-section view 304 illustrates the vertical seal 122 that was shown in phantom in FIG. 1. FIG. 6 illustrates the panel 108 with an endcap 610. The endcap 610 may include at least one track wheel 612 that moves along the vertical track portion 104 and into the first track 110 and the second track 112 of the horizontal track portion 106 illustrated in FIG. 1. The endcap 610 may be coupled to opposite ends of the panel 108 or may be integrally formed on opposite ends of the panel 108 as a part of the panel 108.

In one embodiment, the vertical seal 122 may be coupled to the door jamb 164 to form a seal against the inner surface 606 of the panel 108. A first vertical seal 122 may be coupled to a first side of the door jamb 164, and a second vertical seal 122 may be coupled to a second side of the door jamb 166. The vertical seal 122 may have a height (as measured along a dimension shown by the line 172 in FIG. 1) that is equal to the height of the door 102 when the door 102 is in the closed position.

In one embodiment, the vertical seal may include a bracket 602 coupled to the door jamb 164. The bracket 602 may also include a plurality of openings (not shown) that may receive a fastener to couple the bracket 602 against the door jamb 164. The openings may have a slot shape to allow for lateral adjustments.

In one embodiment, the vertical seal 122 may include a flexible seal 604 coupled to the bracket 602. The flexible seal 604 may contact an inner surface 606 of the panel 108. For example, an outer side 608 of the panel 108 may be directed towards the outside or exterior environment. The inner side 606 of the panel 108 may be directed towards the inside of a building or a warehouse.

The flexible seal 604 may be positioned such that the panel 108 pushes against the flexible seal 604. The force of the panel 108 and the flexible seal 604 wanting to return to its un-flexed state may create the desired seal.

In one embodiment, the seal plate 210 of the header seal 120 may be deployed as the vertical seal 122. In other words, the seal plate 210 and the vertical seal 122 may be the same part.

Thus, the present disclosure provides a seal to prevent air infiltration through a vertically stacking panel door that is made from disconnected panels. The seal system may help to improve energy efficiency in heat and cold.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A header seal for a vertically stacking panel door, comprising:
- a header channel, the header channel comprising:
  - a body portion comprising a plurality of openings to receive a mechanical fastener; and
  - a lip portion coupled to the body portion; and
- a seal plate coupled to a top most vertical panel of the vertically stacking panel door, wherein the seal plate comprises:
  - a bracket comprising a plurality of openings to receive a mechanical fastener to connect the bracket to the top most vertical panel, wherein each opening of the plurality of openings of the bracket comprises a slot to provide an adjustment tolerance towards and away from the header channel when the seal plate is installed on the top most vertical panel; and
  - a flexible member to contact the lip portion to form a seal against the lip portion of the header channel when the vertically stacking panel door is in a closed position.

2. The header seal of claim 1, wherein each opening of the plurality of openings of the body portion comprises a slot to provide an adjustment tolerance when the header channel is installed on a top portion of a wall where the vertically stacking panel door is installed.

3. The header seal of claim 1, wherein the lip portion is coupled at approximately 90 degrees to the body portion.

4. The header seal of claim 3, wherein the body portion and the lip portion are formed as a single metallic piece.

5. The header seal of claim 1, wherein a width of the header channel is equal to a width of a panel of the vertically stacking panel door.

6. The header seal of claim 1, wherein the flexible member comprises rubber or a polymer material.

7. A vertically stacking panel door system, comprising
- a vertically stacking panel door comprising a plurality of disconnected panels;
- a track system to guide movement of the vertically stacking panel door;
- a header channel located between opposing tracks of the track system; and
- a seal plate coupled to a top most panel of the plurality of disconnected panels, wherein the seal plate forms a seal against the header channel when the vertically stacking panel door is in a closed position, wherein the seal plate comprises:
  - a bracket comprising a plurality of openings, each opening of the plurality of openings to receive a mechanical fastener to connect the bracket to the top most panel, wherein each opening of the plurality of openings of the bracket comprises a slot to provide an adjustment tolerance towards and away from the header channel when the seal plate is installed on the top most panel; and a flexible member to contact a lip portion of the header channel to form a seal against the lip portion of the header channel when the vertically stacking panel door is in the closed position.

8. The vertically stacking panel door system of claim 7, wherein the header channel comprises:

a body portion comprising a plurality of openings, each opening of the plurality of openings of the body portion to receive a mechanical fastener; and the lip portion coupled to the body portion.

9. The vertically stacking panel door system of claim 8, wherein each opening of the plurality of openings of the body portion comprises a slot to provide an adjustment tolerance when the header channel is installed on a top portion of a wall where the vertically stacking panel door is installed.

10. The vertically stacking panel door system of claim 8, wherein the lip portion is coupled at approximately 90 degrees to the body portion.

11. The vertically stacking panel door system of claim 7, wherein the flexible member comprises rubber or a polymer material.

12. A vertically stacking panel door system, comprising a vertically stacking panel door comprising a plurality of disconnected panels;

a track system to guide movement of the vertically stacking panel door;

a header channel;

a seal plate coupled to a top most vertical panel of the plurality of disconnected panels, wherein the seal plate forms a seal against the header channel when the vertically stacking panel door is in a closed position, wherein the seal plate comprises:

a bracket comprising a plurality of openings, each opening of the plurality of openings to receive a mechanical fastener to connect the bracket to the top most vertical panel, wherein each opening of the plurality of openings of the bracket comprises a slot to provide an adjustment tolerance towards and away from the header channel when the seal plate is installed on the top most vertical panel; and a flexible member to contact a lip portion of the header channel to form a seal against the lip portion of the header channel when the vertically stacking panel door is in the closed position;

a first vertical seal coupled to a first side of a doorjamb; and a second vertical seal coupled to a second side of the door jamb opposite the first side, wherein the first vertical seal and the second vertical seal are to form a seal against the plurality of disconnected panels when the vertically stacking panel door is in the closed position.

13. The vertically stacking panel door system of claim 12, wherein the first vertical seal and the second vertical seal each comprise:

a bracket to be coupled to the doorjamb; and a flexible seal coupled to the bracket to contact a surface of each one of the plurality of disconnected panels when the vertical vertically stacking panel door is in the closed position.

14. The vertically stacking panel door system of claim 12, wherein the header channel comprises:

a body portion comprising a plurality of openings, each opening of the plurality of openings of the body portion to receive a mechanical fastener; and the lip portion coupled to the body portion.

15. The vertically stacking panel door system of claim 14, wherein each opening of the plurality of openings of the body portion comprises a slot to provide an adjustment tolerance when the header channel is installed on a top portion of a wall where the vertically stacking panel door is installed.

* * * * *